United States Patent
Chun et al.

(10) Patent No.: US 8,428,172 B2
(45) Date of Patent: Apr. 23, 2013

(54) METHOD OF TRANSMITTING AND RECEIVING A MIDAMBLE FOR CHANNEL ESTIMATION OF MULTIPLE ANTENNAS

(75) Inventors: Jin Young Chun, Anyang-si (KR); Hyun Soo Ko, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 12/936,394

(22) PCT Filed: Apr. 3, 2009

(86) PCT No.: PCT/KR2009/001732
§ 371 (c)(1),
(2), (4) Date: Oct. 4, 2010

(87) PCT Pub. No.: WO2009/125946
PCT Pub. Date: Oct. 15, 2009

(65) Prior Publication Data
US 2011/0026627 A1    Feb. 3, 2011

(30) Foreign Application Priority Data

Apr. 10, 2008    (KR) .................. 10-2008-0032937

(51) Int. Cl.
*H04B 7/02* (2006.01)
*H04L 1/02* (2006.01)

(52) U.S. Cl.
USPC .......................................... 375/267; 375/260

(58) Field of Classification Search ................... 375/267, 375/260, 259
See application file for complete search history.

(56) References Cited

U.S. PATENT DOCUMENTS

| 7,139,328 B2 | 11/2006 | Thomas et al. | |
|---|---|---|---|
| 2005/0249305 A1 | 11/2005 | Ponnampalam et al. | |
| 2006/0013151 A1* | 1/2006 | Lee et al. | 370/280 |
| 2006/0094435 A1 | 5/2006 | Thomas et al. | |
| 2008/0159426 A1* | 7/2008 | Jung et al. | 375/260 |
| 2008/0212501 A1* | 9/2008 | Harrang et al. | 370/281 |
| 2009/0016312 A1* | 1/2009 | Tao et al. | 370/344 |
| 2011/0002430 A1* | 1/2011 | Kim et al. | 375/362 |

FOREIGN PATENT DOCUMENTS

KR    10-2006-0040180    5/2006

* cited by examiner

Primary Examiner — David C. Payne
Assistant Examiner — Brian J Stevens
(74) Attorney, Agent, or Firm — Lee, Hong, Degerman, Kang & Waimey

(57) ABSTRACT

A method of transmitting a midamble for channel estimation of multiple antennas performed by a base station in a system having segregated uplink and downlink frequency bands is provided. The method includes transmitting midamble information indicating presence of the midamble within a downlink frame to a user equipment (UE), and transmitting the midamble on a single downlink subframe among at least one downlink subframe included in the downlink frame or on a common zone to the UE by using the multiple antennas. A scheduling overhead of a base station and other overheads can be reduced by decreasing the number of transmissions of a midamble on one downlink frame, and thus limited radio resources can be effectively used.

6 Claims, 10 Drawing Sheets

METHOD OF TRANSMITTING AND RECEIVING A MIDAMBLE FOR CHANNEL ESTIMATION OF MULTIPLE ANTENNAS

CROSS-REFERENCE TO RELATED APPLICATIONS

This application is the National Stage filing under 35 U.S.C. 371 of International Application No. PCT/KR2009/001732, filed on Apr. 3, 2009, which claims the benefit of earlier filing date and right of priority to Korean Application No. 10-2008-0032937, filed on Apr. 10, 2008, the contents of which are incorporated by reference herein in their entirety.

TECHNICAL FIELD

The present invention relates to wireless communications, and more particularly, to a method of transmitting a midamble.

BACKGROUND ART

Wireless communication systems are widely used to provide various types of communications. For example, voice and/or data are provided by the wireless communication systems. A conventional wireless communication system provides multiple users with one or more shared resources. For example, the wireless communication system can use various multiple access schemes such as code division multiple access (CDMA), time division multiple access (TDMA), and frequency division multiple access (FDMA).

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

A system profile based on the conventional IEEE 802.16 standard supports only a time division duplex (TDD) scheme. In the TDD scheme, uplink transmission and downlink transmission are achieved at different times while occupying the same frequency band. Since an uplink channel and a downlink channel have almost reciprocal characteristics, the TDD scheme has an advantage in that frequency selective scheduling is simple.

A frequency division duplex (FDD) and/or half-duplex FDD (H-FDD) scheme is expected to be introduced in the IEEE 802.16 standard. A user equipment (UE) using the FDD scheme can simultaneously perform uplink transmission and downlink transmission on different frequency bands. A UE using the H-FDD scheme cannot simultaneously perform uplink transmission and downlink transmission on different frequency bands. Therefore, when uplink transmission is performed by UEs belonging to one group in an H-FDD system, a base station (BS) performs downlink transmission for UEs belonging to another group. That is, frequencies are divided for uplink transmission and downlink transmission, and times are divided to be used by respective groups.

A midamble is a channel estimation signal transmitted by the BS to obtain a channel state for each antenna in a multiple-input multiple-output (MIMO) system using a plurality of antennas. By receiving the midamble, a UE can estimate the channel state of the BS for each antenna. In a TDD-based frame structure, a first orthogonal frequency division multiplexing (OFDM) symbol in a spatial time code (STC) zone is defined as a position at which the midamble is transmitted. In case of using an FDD or H-FDD-based frame structure, limited radio resources may be wasted when the BS transmits the midamble every time for all groups.

Accordingly, there is a need for a method of transmitting a midamble by using minimum radio resources for transmission of the midamble.

DISCLOSURE OF INVENTION

Technical Problem

The present invention provides a method of transmitting a midamble.

Technical Solution

According to an aspect of the present invention, a method of transmitting a midamble for channel estimation of multiple antennas performed by a base station in a system having segregated uplink and downlink frequency bands is provided. The method includes transmitting midamble information indicating presence of the midamble within a downlink frame to a user equipment (UE), and transmitting the midamble on a single downlink subframe among at least one downlink subframe included in the downlink frame or on a common zone to the UE by using the multiple antennas. The midamble is mapped to a last orthogonal frequency division multiplexing (OFDM) symbol of the single downlink subframe. The common zone is a part of the downlink frame which all user equipments can receive.

According to another aspect of the present invention, a method of receiving a midamble for channel estimation of multiple antennas performed by a UE in a system having segregated uplink and downlink frequency bands is provided. The method includes receiving midamble information indicating presence of the midamble within a downlink frame from a base station, and receiving the midamble on a single downlink subframe among at least one downlink subframe included in the downlink frame or on a common zone from the base station. The midamble is mapped to at a last orthogonal frequency division multiplexing (OFDM) symbol of the single downlink subframe. The common zone is a part of the downlink frame which all user equipments can receive.

Advantageous Effects

According to the present invention, in a frequency division duplex (FDD) and/or half-duplex FDD (H-FDD) system, a scheduling overhead of a base station and other overheads can be reduced by decreasing the number of transmissions of a midamble on one downlink frame, and thus limited radio resources can be effectively used. In addition, user equipments, which are allocated to different subframes according to a group to which the user equipments belong, can know an exact transmission position of the midamble, and signaling for indicating presence of the midamble can be reduced.

MODE FOR THE INVENTION

Figure 1:
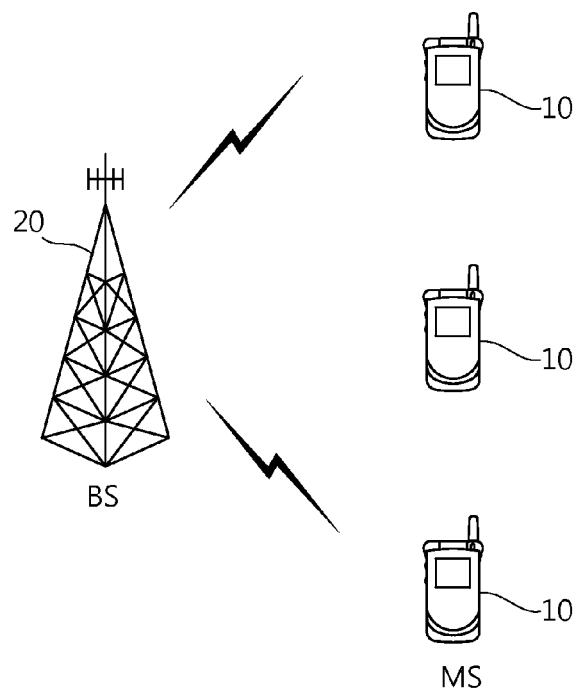
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one mobile station (MS) 10 and a base station (BS) 20. The MS 10 may be fixed or mobile, and may be referred to as another terminology, such as a user equipment (UE), a user terminal (UT), a subscriber station (SS), a wireless device, etc. The BS 20 is generally a fixed station that communicates with the MS 10 and may be referred to as another terminology, such as a node-B, a base transceiver system (BTS), an access point, etc. There are one or more cells within the coverage of the BS 20.

A downlink (DL) represents a communication link from the BS 20 to the MS 10, and an uplink (UL) represents a communication link from the MS 10 to the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

In the following description, a slot is a minimum unit of possible data allocation, and is defined with a time and a subchannel. The number of subchannels depends on an FFT size and time-frequency mapping. Each subchannel includes a plurality of subcarriers. The number of subcarriers included in each subchannel differs according to a permutation rule. Permutation denotes mapping from a logical subchannel to a physical subcarrier.

Figure 2:
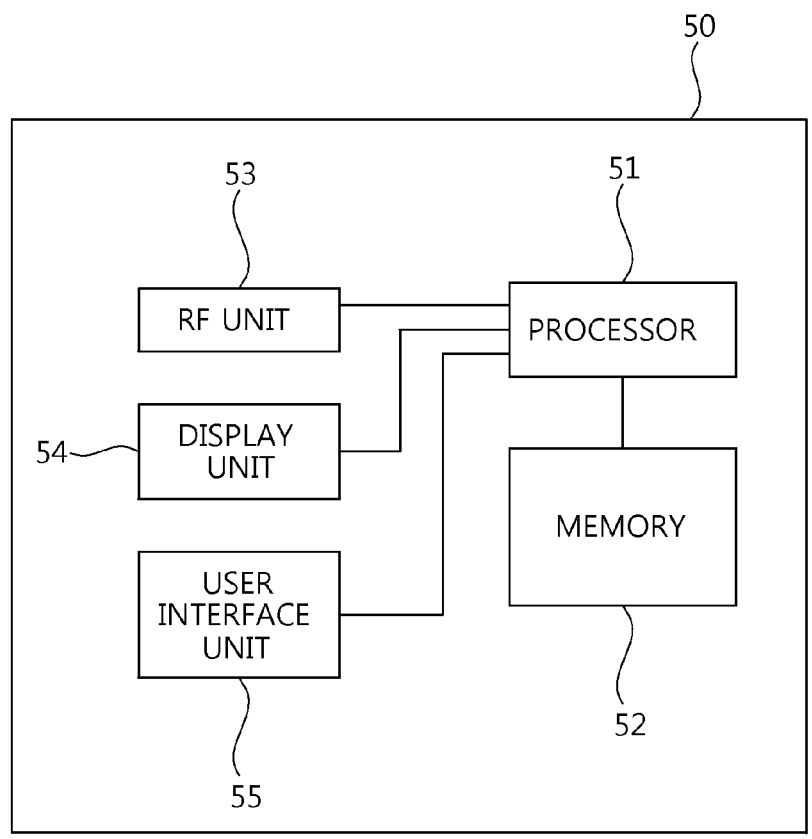
FIG. 2 is a block diagram showing constitutional elements of a user equipment.

FIG. 2 is a block diagram showing constitutional elements of a user equipment (UE).

Referring to FIG. 2, a UE 50 includes a processor 51, a memory 52, a radio frequency (RF) unit 53, a display unit 54, and a user interface unit 55. The processor 51 manages data communication of a physical layer or a medium access control (MAC) layer. A data communication method described below can be implemented by the processor 51. The memory 52 is coupled to the processor 51 and stores an operating system, applications, and general files of the UE 50. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Hereinafter, frequency division duplex (FDD) and half-duplex FDD (H-FDD) will be described. In an FDD or H-FDD system, a UL channel and a DL channel are positioned in segregated frequency bands. DL data and UL data can be transmitted in a burst unit. The DL channel and the UL channel use frames having a fixed length, and the frames have the same start point and the same end point along a time axis. The use of the frame having a fixed length can simplify a bandwidth allocation algorithm. There is no restriction on the frame length. The frame may have a length of 5 milliseconds (ms), 2.5 ms, or 1.25 ms.

A full duplex-FDD UE (i.e., FDD UE) can simultaneously perform data transmission and data reception. A half duplex-FDD UE (i.e., H-FDD UE) performs either data transmission or data reception, and cannot simultaneously perform data transmission and data reception. If the H-FDD UE is used, a bandwidth controller does not allocate a UL bandwidth at the same time of receiving data on a DL channel. When DL data is transmitted in a burst unit, a system can use a different modulation scheme for each burst, and can support both the FDD UE and the H-FDD UE within one frame.

Figure 3:
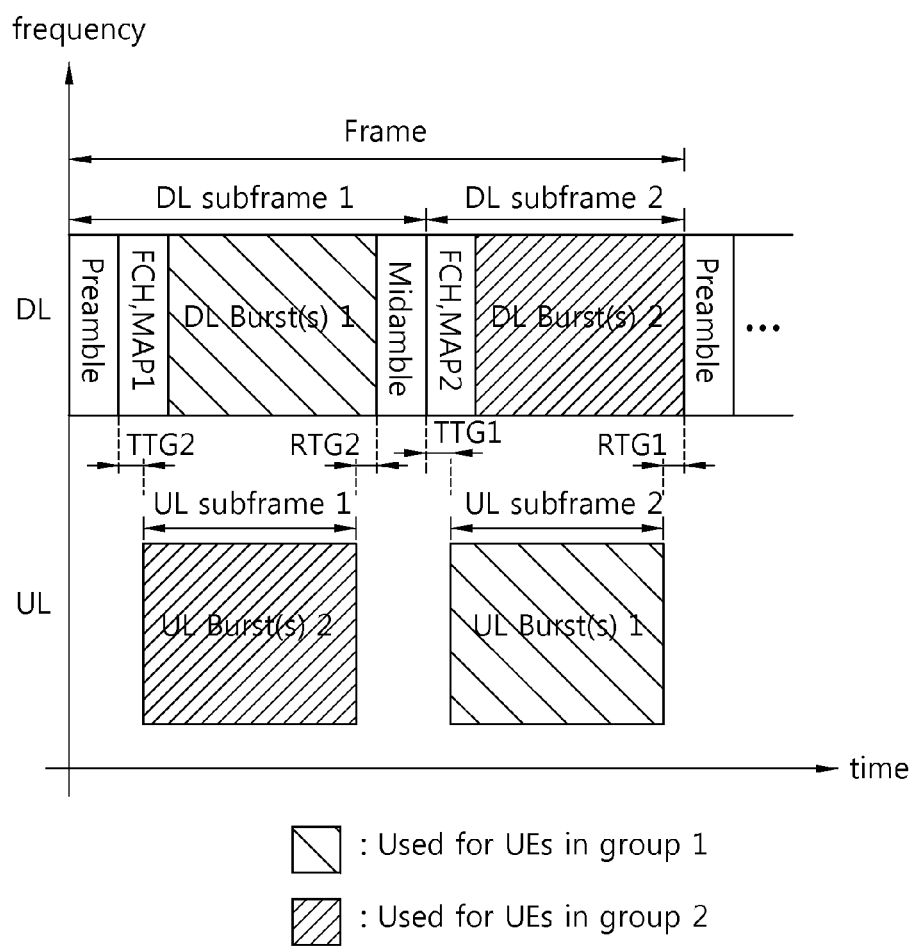
FIG. 3 shows an exemplary structure of a frequency division duplex (FDD) or half-duplex FDD (H-FDD) frame.

FIG. 3 shows an exemplary structure of an FDD or H-FDD frame.

Referring to FIG. 3, the frame includes a DL frame and a UL frame. The DL frame and the UL frame use different frequency bands. The DL frame includes two DL subframes. The UL frame includes two UL subframes. A DL subframe 1 includes a preamble, a frame control header (FCH), a MAP 1, at least one burst, and a midamble. A DL subframe 2 includes an FCH, a MAP 2, and at least one burst. Each UL subframe includes at least one burst. In this case, on a time axis, the preamble and the midamble do not overlap with the UL burst. This is because H-FDD UEs cannot perform uplink transmission at the same time of receiving the preamble or the midamble.

Each subframe does not have a fixed length in a time domain. Thus, each subframe may have a different length. The number of subframes included in one frame is not limited to 2, and thus may be less than or greater than 2.

In case of using the H-FDD UEs, a group 1 is defined as a group of UEs which receive data on a DL burst 1 according to a MAP 1 and transmit the data to a BS on a UL burst 2. A group 2 is defined as a group of UEs which transmit data to the BS on a UL burst 1 according to a MAP 2 and receive the data on a DL burst 2. This is because the H-FDD UEs cannot simultaneously perform data transmission and reception as described above. A DL burst and a UL burst that can be used within a frame differ according to a group of UEs.

Conceptually, the DL subframes 1 and 2 are not used for identification of a zone that can be used for each group. In the present invention, the DL subframes are used to define a subordinate frame including basic zones (e.g., an FCH, MAP, and at least one burst). Therefore, even if the preamble or the midamble is included in the DL subframe 1, the preamble or the midamble can be received not only by UEs in the group 1 but also by UEs in the group 2.

The BS may arbitrarily determine grouping of UEs and then report the grouping result to the UEs. Alternatively, the UEs may determine grouping and then request the BS to perform the grouping. An amount of radio resources required by each UE, use of a multicast and broadcast service (MBS), an MBS type, etc., are examples of a criterion for performing the grouping.

A transmit transition gap (TTG) is a duration required when a UE switches from a receive (Rx) mode to a transmit (Tx) mode. A receive transition gap (RTG) is a duration required when the UE switches from the Tx mode to the Rx mode.

The preamble is used to acquire time synchronization and frequency synchronization between the BS and the UE, and is also used for cell search and frequency offset estimation. A preamble position or the number of preambles within a frame may vary. Only one preamble may be positioned in a first portion of the frame. One more preamble may be positioned in front of the DL subframe 2. A plurality of preambles may be respectively positioned in a plurality of frames. All subcarriers are allocated, modulated, and inserted with a specific interval in the preamble. Thus, the preamble can be used as a reference point for the entire time period. All signals transmitted and received between the BS and the UE are inserted according to the preamble, and thus acquisition of the preamble is the most basic and important operation for data communication.

The FCH may be positioned between the preamble and the MAP. The FCH is a zone for transmitting a DL frame prefix. The DL frame prefix includes a length of a DL-MAP message and coding scheme information of a DL-MAP.

The MAP consists of a DL-MAP and a UL-MAP. There is no restriction on a type of the MAP, and thus the MAP may be a compressed MAP, a sub MAP, a hybrid automatic repeat request (HARQ) MAP, etc. The DL burst is a zone for transmitting data which is sent by the BS to the UE. The UL burst is a zone for transmitting data which is sent by the UE to the BS. The DL-MAP is a zone for transmitting the DL-MAP message. The DL-MAP message defines access of the DL channel. This implies that the DL-MAP message defines indication and/or control information for the DL channel. The UL-MAP is a zone for transmitting the UL-MAP message. The UL-MAP message defines access of the UL channel. This implies that the UL-MAP message defines indication and/or control information for the UL channel.

The midamble is a reference signal transmitted by the BS to the UE to estimate the DL channel in a multiple input multiple output (MIMO) system using a plurality of antennas for data transmission. The midamble is a channel estimation signal, and can be referred to as other terms such as a reference signal, a pilot, a MIMO midamble, or other equivalent terms. The UE receives the midamble to estimate channel information for each antenna of the BS. Further, the UE obtains a weight from the estimated channel information and then feeds back the weight to the BS. By using the fed back weight in data transmission, the BS can transmit data more accurately.

The preamble and midamble zones may be positioned in particular one DL subframe as shown in FIG. 3. The preamble and midamble zones may be positioned in a common zone (not shown) on which all UEs can perform data reception.

The midamble is transmitted by using a last OFDM symbol of the DL subframe 1, and is not transmitted on the DL subframe 2. That is, the midamble is transmitted only once every frame by using any one of the DL subframes. The purpose of this is to reduce an overhead caused by frequent transmission of the midamble.

Hereinafter, a method of receiving a midamble for each group is described. For example, UEs belonging to the group 1 operate in the Rx mode when receiving the preamble, the FCH, the MAP, the DL burst 1, and the midamble, in that order. Upon receiving up to the midamble, the UEs belonging to the group 1 switch to the Tx mode and transmit the UL burst 2 to the BS. On the other hand, upon receiving the preamble in the Rx mode, the UEs belonging to the group 2 switch to the Tx mode and transmit the UL burst 1 to the BS. Thereafter, the UEs switch to the Rx mode and receive the midamble, the FCH, the MAP, the DL burst 2, and the preamble, and then switch to the Tx mode. Of course, various modifications can be made in the method of receiving the preamble for each group.

Although the midamble is transmitted only once every one frame, if the midamble is positioned between the DL subframes 1 and 2, the UEs belonging to each group can receive the midamble without an overhead caused by additional switching of the Tx/Rx mode. Accordingly, limited radio resources can be more effectively used.

Figure 4:
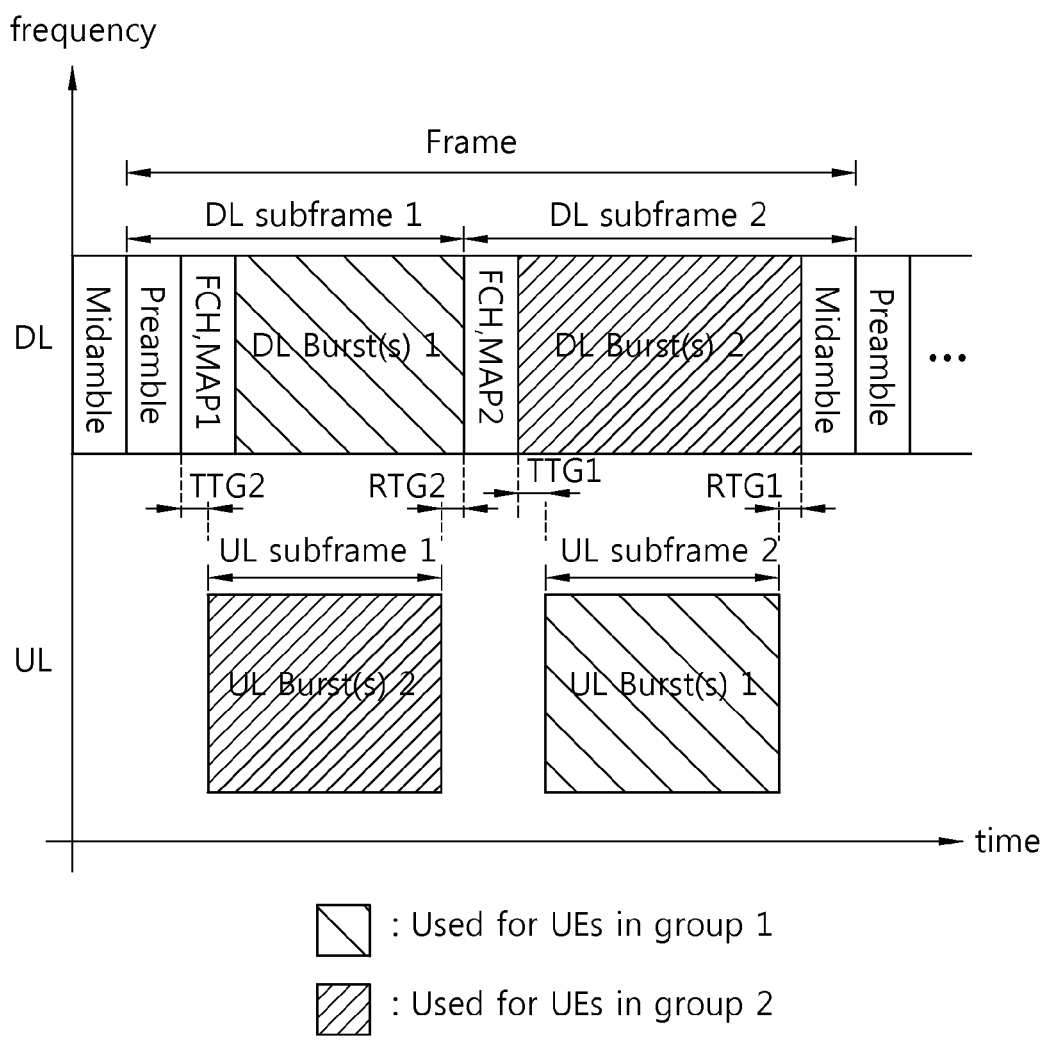
FIG. 4 shows another exemplary structure of an FDD or H-FDD frame.

FIG. 4 shows another exemplary structure of an FDD or H-FDD frame.

The structure of FIG. 4 is the same as the structure of FIG. 3 except that a midamble is positioned at a last OFDM symbol of a DL subframe 2. Even if the midamble is positioned in the same DL frame, each UE may receive the midamble in a different manner when the UEs belong to different groups.

For example, UEs belonging to the group 1 operate in the Rx mode when receiving a midamble, a preamble, an FCH, a MAP, a DL burst 1, in that order. Upon receiving up to the DL burst 1, the UEs belong to the group 1 switch to the Tx mode and transmit a UL burst 2 to a BS. On the other hand, after transmitting a UL burst 1 to the BS in the Tx mode, UEs belonging to the group 2 switch to the Rx mode and receive an FCH, a MAP, a DL burst 2, a midamble, and a preamble.

Even if the midamble is transmitted only once every one frame, when the midamble is transmitted from the BS by using the last OFDM symbol of the DL subframe, the UEs belonging to each group can receive the midamble without an overhead caused by additional switching of the Tx/Rx mode.

Figure 5:
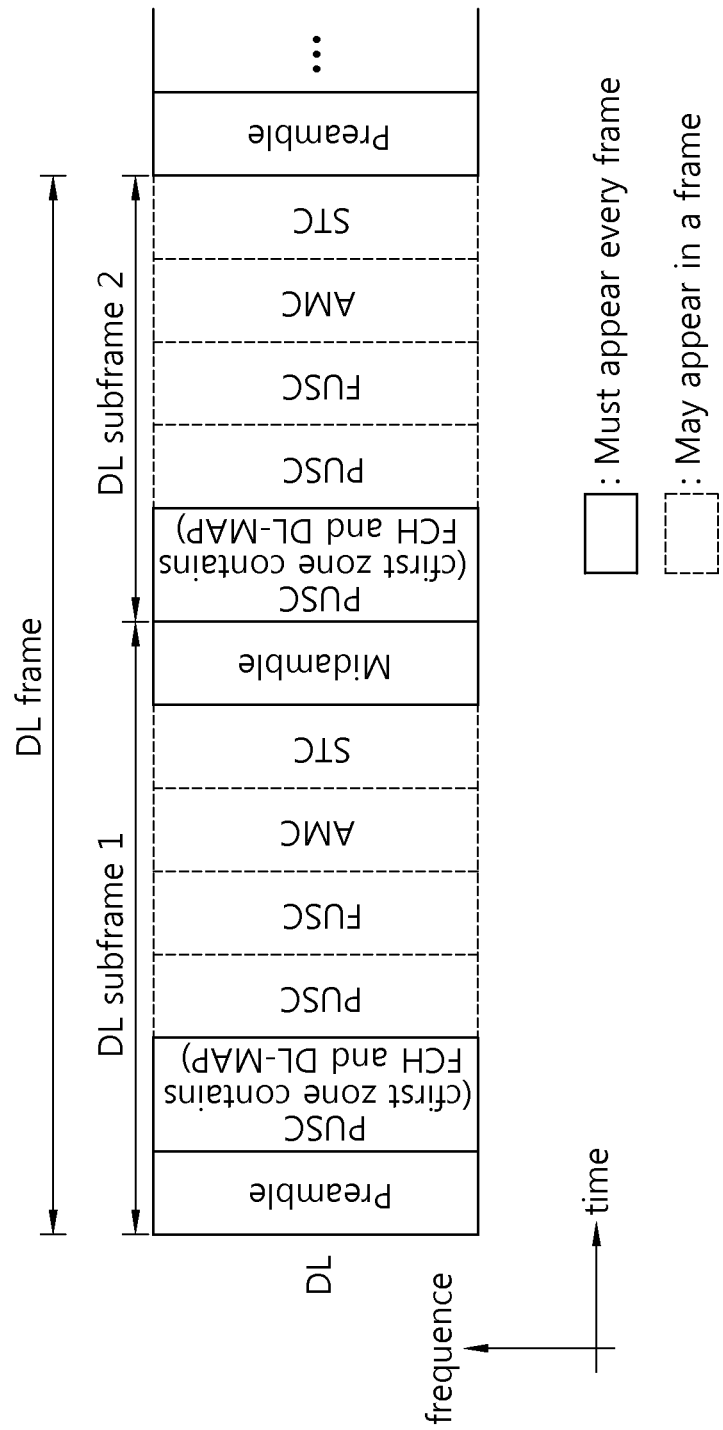
FIG. 5 shows another exemplary structure of an FDD or H-FDD frame.

FIG. 5 shows another exemplary structure of an FDD or H-FDD frame. Hereinafter, a slot is a minimum unit of possible data allocation, and is defined with a time and a subchannel. The subchannel is a basic unit of dividing frequency resources, and includes a plurality of subcarriers. The number of OFDM symbols and the number of subchannels included in one slot differ according to a permutation rule. Permutation denotes mapping from a logical subchannel to a physical subcarrier.

Referring to FIG. 5, a DL subframe 1 includes a preamble zone, 5 permutation zones, and a midamble zone. The preamble zone is immediately followed by a permutation zone containing an FCH and a DL-MAP, and this permutation zone is mapped to a subcarrier according to partial usage of subchannels (PUSC). The PUSC is a permutation rule in which some subcarriers are allocated for data transmission. A permutation rule in which all subchannels are allocated for data transmission is referred to as full usage of subchannels (FUSC).

The FCH is transmitted in the PUSC zone by using a necessary channel coding scheme with a channel coding rate of 1/2, a repetition coding scheme, and a quadrature phase shift keying (QPSK) modulation scheme. The FCH includes DL_Frame_Prefix which defines a length of a subsequently transmitted DL-MAP and a repetition coding scheme of a DL-MAP message. Different permutation rules can be applied to the remaining 4 permutation zones except for the preamble zone and the permutation zone containing the FCH and the DL-MAP according to a cell condition.

A DL subframe 2 has the same structure as the DL subframe 1 except that the preamble is not present. A UL frame (not shown) includes a permutation zone of PUSC and a permutation zone of optional PUSC and adaptive modulation and coding (AMC). In the UL frame, a different permutation rule can be applied to each permutation zone according to the cell condition.

A scheduler of a BS can change the permutation rule applied to each permutation zone by using a zone switch information element (IE) of the DL-MAP according to a channel state. Herein, the AMC corresponds to localized allocation for obtaining a channel selective gain. The remaining permutation rules other than the AMC correspond to distributed allocation for obtaining a frequency diversity gain.

The DL subframes may optionally include a spatial time code (STC) zone. All DL bursts existing in the STC zone are processed with STC. The STC zone may include or may not include the DL-MAP independently. If the STC zone includes the DL-MAP independently, the STC zone includes an STC preamble, an STC-processed FCH, and an STC-processed burst. If the STC zone does not include the DL-MAP independently, the STC zone includes only the STC preamble and the STC-processed burst.

The position of the midamble is shown for exemplary purpose only. Thus, as shown in FIG. 4, the midamble may be positioned at a last OFDM symbol immediately next to the STC zone of the DL subframe 2.

Now, midamble information will be described. The midamble information is an STC zone message (i.e., OFDMA_STC_DL_Zone IE) and is included in a DL-MAP. The midamble information includes midamble presence, midamble position, and midamble boosting. The midamble presence and the midamble position are information that indicates whether the midamble is transmitted in a DL frame and, if the midamble is transmitted, indicates a position of a specific OFDM symbol of a specific DL subframe. The midamble boosting is a message used when Tx power is boosted by 3 dB in a process of transmitting the midamble.

Table 1 shows an example of the midamble information.

TABLE 1

| Syntax | Size (bit) | Notes |
|---|---|---|
| Midamble presence | 1 | 0: Not present1: midamble present at the following position a. In TDD, at the first OFDM symbol in STC zone. b. In FDD, at the last OFDM symbol of the current group 1 DL subframe. c. In H-FDD for group 1, at the last OFDM symbol of the current group 1 DL subframe. d. In H-FDD for group 2, at the previous OFDM symbol of FCH in the next group 2 DL subframe. |
| Midamble boosting | 1 | 0: No boost1: Boosting(3 dB) |

Referring to Table 1, the midamble presence and the midamble position are 1-bit information. If 0, the information indicates absence of the midamble, and if 1, the information indicates presence of the midamble. When the presence of the midamble is determined, the midamble position is automatically determined according to which duplex scheme uplink and downlink are divided in a system.

In a TDD system, the midamble is positioned at a first OFDM symbol at which the STC zone starts. In an FDD system, the midamble is positioned at a last OFDM symbol of a subframe at which a UE belonging to the group 1 receives data. In an H-FDD system, even if the midamble is positioned in the same DL frame as shown in FIG. 6, the midamble position may indicate a midamble of a different DL subframe according to a group of UEs.

Figure 6:
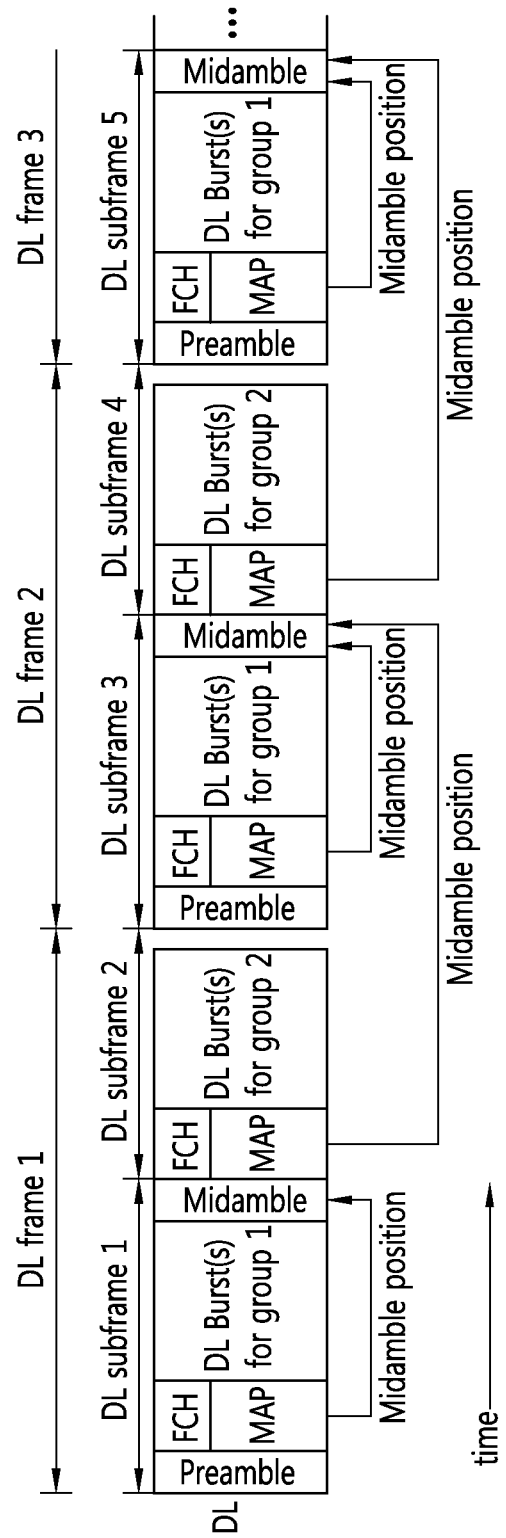
FIG. 6 shows an exemplary method of determining a midamble position in an H-FDD system.

FIG. 6 shows an exemplary method of determining a midamble position in an H-FDD system.

Referring to FIG. 6, a DL frame 2 includes a DL subframe 3 and a DL subframe 4. UEs of the group 1 read midamble information contained in a MAP of the DL subframe 3, and UEs of the group 2 read midamble information contained in a MAP of the DL subframe 4. In the presence of a midamble, the UEs of the group 1 determine that a position of the to-be-received midamble is a last OFDM symbol of the DL subframe. On the other hand, the UEs of the group 2 determine that the position of the to-be-received midamble is a last OFDM symbol of a DL subframe 5 included in a next DL frame 3 (or an immediately previous OFDM symbol of an FCH of a DL subframe 6).

Table 2 shows another example of the midamble information.

TABLE 2

| Syntax | Size (bit) | Notes |
|---|---|---|
| Midamble presence | 1 | 0: Not present1: midamble present at the following position a. In TDD, at the first OFDM symbol in STC zone. b. In FDD, at the last OFDM symbol of the current group 2 DL subframe. c. In H-FDD for group 1, at the previous OFDM symbol of next preamble. d. In H-FDD for group 2, at the last OFDM symbol of the current group 2 DL subframe. |
| Midamble boosting | 1 | 0: No boost1: Boosting(3 dB) |

Table 2 is the same as Table 1 above in case of H-FDD, except that a method of determining a preamble position is different (see c and d). In the H-FDD system, even if the midamble is positioned in the same DL frame in different groups, the midamble position is regarded to be identical. This will be described in greater detail with reference to FIG. 7.

Figure 7:
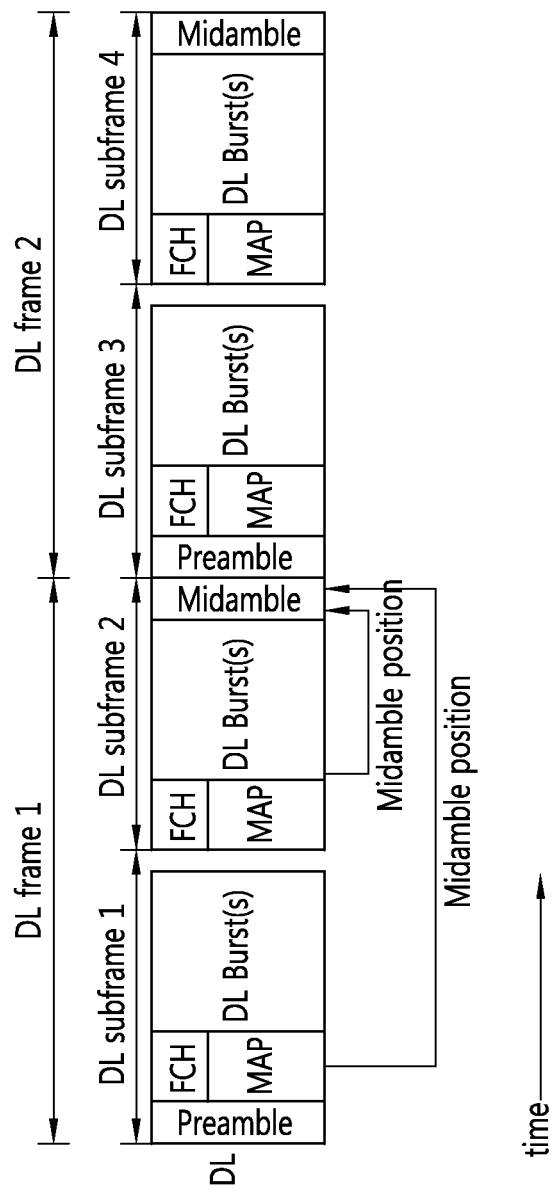
FIG. 7 shows another exemplary method of determining a midamble position in an H-FDD system.

FIG. 7 shows another exemplary method of determining a midamble position in an H-FDD system.

Referring to FIG. 7, a DL frame 1 includes a DL subframe 1 and a DL subframe 2. UEs of the group 1 read midamble information contained in a MAP of the DL subframe 1, and UEs of the group 2 read midamble information contained in a MAP of the DL subframe 2. In the presence of a midamble, the UEs of the group 1 determine that a position of the to-be-received midamble is an immediately previous OFDM symbol of a next preamble. In addition, the UEs of the group 2 determine that the position of the to-be-received midamble is a last OFDM symbol of the DL subframe 2. For the groups 1 and 2, the to-be-received midamble has the same position in practice even though a relative difference exists for each group in an analytical sense.

In a multiple-antenna system using feedback information regarding a channel state, limited radio resources may be wasted when a midamble is transmitted every time even until the channel state is reliable. The resources can be more effectively used by allowing the STC zone message (i.e., OFDMA_STC_DL_Zone IE) to include midamble information of Table 3 below. The midamble information of Table 3 may use reserved 4 bits of the STC zone message.

Table 3 shows another example of the midamble information.

TABLE 3

| Syntax | Size (bit) | Notes |
| --- | --- | --- |
| Duration (d) | 2 | Maintain given DL STC information for $2^d$ frames |
| Midamble period (p) | 2 | If Midamble presence == 1 then, Midamble shall be transmitted every $2^p$ frames |

Referring to Table 3, a duration d is information indicating that a given STC zone message (i.e., OFDMA_STC_DL_Zone IE) is maintained for a specific time period. For example, if d=1, it indicates that the given STC zone message is maintained for $2^1$=2 frames. The duration is 2-bit information, and thus the STC zone message may not be transmitted for up to $2^2$=4 frames. In this manner, a BS may transmit the STC zone message only once with a period of several frames.

A midamble period is midamble information indicating a frame period at which the midamble is transmitted when the midamble is not transmitted every frame. In the presence of the midamble, if p=2, the midamble is transmitted once every $2^2$=4 frames. As such, if the STC zone message or the midamble presence is not transmitted every frame, the BS can reduce resources to be used for DL control information. In addition, the UEs does not have to receive and decode the STC zone message or the midamble presence every time, resulting in power saving.

In Table 1 to Table 3, the midamble presence is indicated by one bit, the duration is indicated by two bits, and the midamble period is indicated by two bits. However, this is for exemplary purposes only, and thus the number of bits required for each midamble information may change variously.

Figure 8:
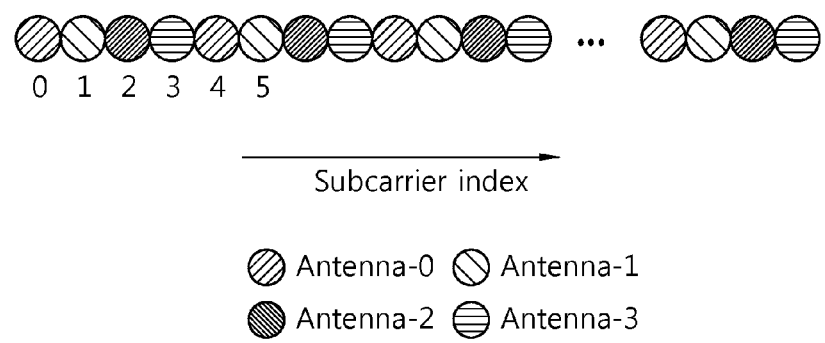
FIG. 8 is a diagram for explaining a method of allocating a subcarrier corresponding to a midamble when four antennas are used in full usage of subchannels (FUSC).

FIG. 8 is a diagram for explaining a method of allocating a subcarrier corresponding to a midamble when four antennas are used in FUSC.

Referring to FIG. 8, a MIMO midamble consists of one OFDM symbol to be mapped to multiple antennas. A method of allocating a subcarrier corresponding to the MIMO midamble can be expressed by Math Figure 1.

Math Figure 1

$$\text{Midamble-Carrier-Set: } -(N_{used}/2) + n + 2k \times \left\lceil \frac{N_t}{2} \right\rceil \quad \text{[Math. 1]}$$

In Equation 1, n denotes an index of an antenna to be mapped, $N_t$ denotes a total number of antennas, k denotes a subcarrier index, and Nused denotes a total number of subcarriers in use.

Referring to Equation 1, if a BS has two antennas (n=0, 1), subcarriers in use can be expressed by $-(N_{used}/2)+n+2k$. If the BS has three antennas (n=0, 1, 2), the subcarriers in use can be expressed by $-(N_{used}/2)+n+4k$. If the BS has four antennas (n=0, 1, 2, 3), the subcarriers in use can be expressed by $-(N_{used}/2)+n+4k$. In case of PUSC, a cluster consisting of 14 contiguous subcarriers is allocated with a pilot for each antenna instead of a data subcarrier.

Figure 9:
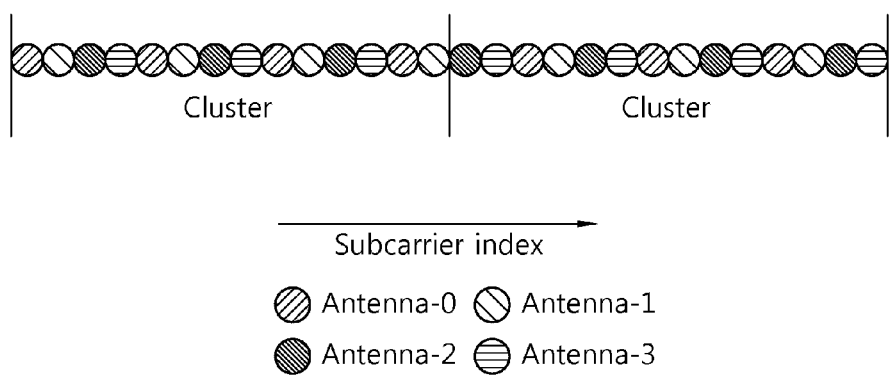
FIG. 9 is a diagram for explaining a method of allocating a subcarrier corresponding to a midamble when four antennas are used in partial usage of subchannels (PUSC).

FIG. 9 is a diagram for explaining a method of allocating a subcarrier corresponding to a midamble when four antennas are used in PUSC.

Referring to FIG. 9, a method of allocating a pilot for each antenna can be expressed by Math Figure 2.

Math Figure 2

$$\text{Midamble-Carrier-Set:} -(N_{used}/2) + n + N_t k \quad \text{[Math.2]}$$

In Equation 2, n denotes an index of an antenna to be mapped, $N_t$ denotes a total number of antennas, k denotes a subcarrier index, and Nused denotes a total number of subcarriers in use. Referring to Equation 2, if the BS has two antennas (n=0, 1), even subcarriers are allocated to an antenna having an index of 0, and odd subcarriers are allocated to an antenna having an index of 1. If the BS has three antennas (n=0, 1, 2), subcarriers can be expressed by 4k. If the BS has four antennas (n=0, 1, 2, 3), the subcarriers can be expressed by 4k.

Figure 10:
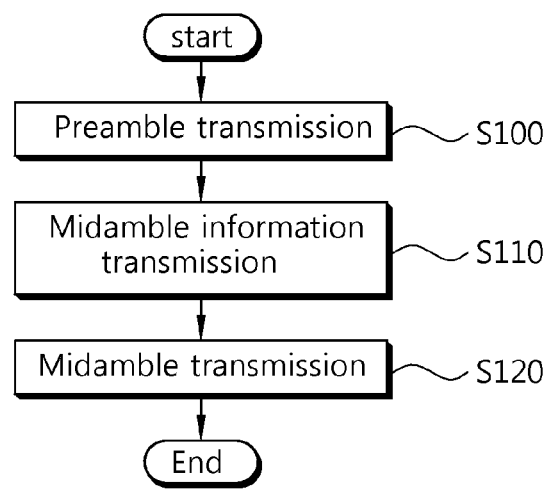
FIG. 10 is a flowchart showing a method of transmitting a midamble.

FIG. 10 is a flowchart showing a method of transmitting a midamble. It is assumed that the frame structure of FIG. 3 or FIG. 4 is used in the description of FIG. 10.

Referring to FIG. 10, a BS transmits a preamble (step S100). The preamble is a reference signal used to acquire DL synchronization. The preamble may consist of a first OFDM symbol at which a DL frame generally starts. The BS includes a transmission element having multiple antennas.

The BS transmits midamble information (step S110). The midamble information reports presence of the midamble, and is included in a DL-MAP STC zone message (i.e., OFDMA_STC_DL_Zone IE). The midamble information may be as shown in Table 1 or Table 2 above. Basically, the BS transmits the midamble information once every DL frame.

The BS transmits the midamble (step S120). The midamble is transmitted basically once every DL frame. However, if a midamble period is given as shown in Table 3 above, the midamble may be transmitted once every several DL frames. The position of the midamble may differ according to the structure of FIG. 3 or FIG. 4. UEs belonging to each group can receive the midamble transmitted by the BS according to the method of receiving the midamble for each group.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a midamble, performed by a base station, for channel estimation of multiple antennas in a system having segregated uplink and downlink frequency bands, the method comprising:

transmitting midamble information comprising a duration and a midamble period to a user equipment (UE), wherein the duration indicates a valid time of the midamble information and the midamble period indicates a downlink frame at which a midamble is transmitted among a plurality of downlink frames; and transmitting the midamble on a predetermined downlink subframe among a plurality of downlink subframes included in the downlink frame to the UE by using the multiple antennas, wherein the midamble is mapped to a last orthogonal frequency division multiplexing (OFDM) symbol of the predetermined downlink subframe in a time domain, and to subcarriers determined by a total number of the multiple antennas and an index of an antenna to be mapped in a frequency domain, and wherein the subcarriers corresponding to an OFDM symbol used to transmit the midamble are allocated according to the following equation:

$$-(N_{used}/2) + n + 2k \times \left\lceil \frac{N_t}{2} \right\rceil$$

where n denotes an index of an antenna to be mapped, Nt denotes a total number of the multiple antennas, k denotes a subcarrier index, and $N_{used}$ denotes a total number of subcarriers in use.

2. The method of claim 1, wherein the predetermined downlink subframe comprises a spatial time code (STC)-processed burst zone, and the midamble is transmitted on the STC-processed burst zone.

3. The method of claim 1, wherein the downlink frame comprises two contiguous downlink subframes.

4. The method of claim 1, wherein the midamble information indicates a different downlink subframe according to an uplink/downlink duplex scheme.

5. A method of receiving a midamble, performed by a user equipment (UE), for channel estimation of multiple antennas in a system having segregated uplink and downlink frequency bands, the method comprising:

receiving midamble information comprising a duration and a midamble period from a base station (BS), wherein the duration indicates a valid time of the midamble information and the midamble period indicates a downlink frame at which a midamble is transmitted among a plurality of downlink frames; and receiving the midamble based on the midamble information, wherein the midamble is received on a predetermined downlink subframe among a plurality of downlink subframes included in the downlink frame by using the multiple antennas from the base station, wherein the midamble is mapped to a last orthogonal frequency division multiplexing (OFDM) symbol of the predetermined downlink subframe in a time domain, and to subcarriers determined by a total number of the multiple antennas and an index of an antenna to be mapped in a frequency domain, and wherein the subcarriers corresponding to an OFDM symbol used to receive the midamble are allocated according to the following equation:

$$-(N_{used}/2) + n + 2k \times \left\lceil \frac{N_t}{2} \right\rceil$$

where n denotes an index of an antenna to be mapped, Nt denotes a total number of the multiple antennas, k denotes a subcarrier index, and $N_{used}$ denotes a total number of subcarriers in use.

6. The method of claim 5, wherein the UE uses a half-duplex frequency division duplex (H-FDD) scheme in which the UE cannot perform data transmission on an uplink subframe simultaneously with data reception on the downlink subframe.

* * * * *